United States Patent [19]

Bacher

[11] 4,178,808

[45] Dec. 18, 1979

[54] SHEAVE FOR A SPEED VARIATOR AND A METHOD OF REPLACING A BELT THEREON

[75] Inventor: Michel Bacher, Garges-les-Gonesse, France

[73] Assignee: Societe Anonyme Francaise du Ferodo, Paris, France

[21] Appl. No.: 863,239

[22] Filed: Dec. 22, 1977

[30] Foreign Application Priority Data

Dec. 31, 1976 [FR] France .................. 76 39743

[51] Int. Cl.² .................. F16H 55/52; F16H 55/56; F16F 1/34; B23P 19/04
[52] U.S. Cl. ................... 74/230.17 E; 403/329; 29/256; 267/161
[58] Field of Search ............. 74/230.17 A, 230.17 B, 74/230.17 C, 230.17 E, 230.17 R, 230.17 D, 229, 230.01, 230, 227, 230.3, 230.5, 230.7, 230.8; 403/329; 29/256, 225, 226, 229, 159 R, 159.3; 267/161, 162, 163

[56] References Cited

U.S. PATENT DOCUMENTS

| 2,073,146 | 3/1937 | Gardiner | 267/161 |
|---|---|---|---|
| 2,172,641 | 9/1939 | Piron | 29/256 |
| 2,191,531 | 2/1940 | Judelshon | 74/230.17 D |
| 3,078,556 | 2/1963 | Carroll | 29/226 |
| 3,115,699 | 12/1963 | Nakahira | 29/226 |
| 3,216,098 | 11/1965 | Ratz | 29/226 |
| 3,368,266 | 2/1968 | Shultz | 29/226 |
| 4,020,711 | 5/1977 | Woollard | 74/230.17 E |

FOREIGN PATENT DOCUMENTS

| 1263410 | 4/1902 | France | 74/230.17D |
|---|---|---|---|
| 949560 | 2/1964 | United Kingdom | 74/230.17 R |
| 1245984 | 9/1971 | United Kingdom | 267/161 |
| 1437455 | 5/1976 | United Kingdom | 29/256 |

Primary Examiner—Samuel Scott
Assistant Examiner—William R. Henderson
Attorney, Agent, or Firm—Charles E. Brown

[57] ABSTRACT

A sheave for a speed variator comprising a fixed and a movable side mounted for rotation with a common shaft. A diaphragm spring urges the movably slide towards the fixed side to clamp a V-belt therebetween. The fixed side may be removed and turned around and then tightened with its own threaded fastener on the shaft to urge the movable side against the force of the diaphragm spring to a retracted position. A retaining member, e.g. a screwdriver, cooperates with the movable side to temporarily hold the same in its retracted position while the fixed side is removed again and turned around and secured by the threaded member in its normal position. The V-belt is then repositioned between the side and the retaining member released. Alternatively, the retaining member may be released automatically, e.g. centrifugally, when the variator is set into motion again.

21 Claims, 9 Drawing Figures

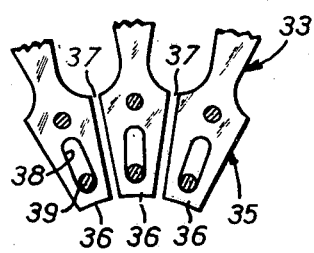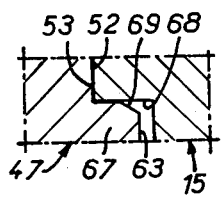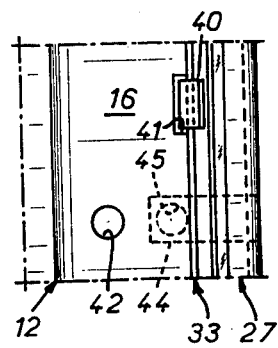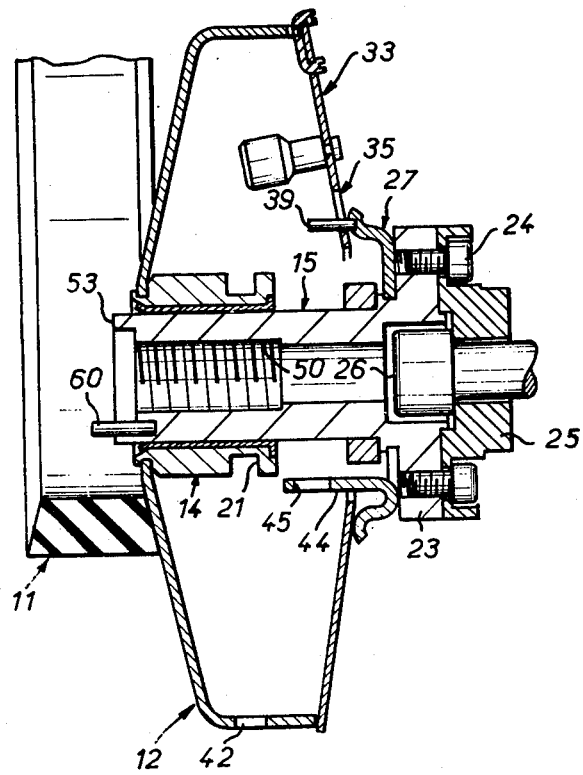

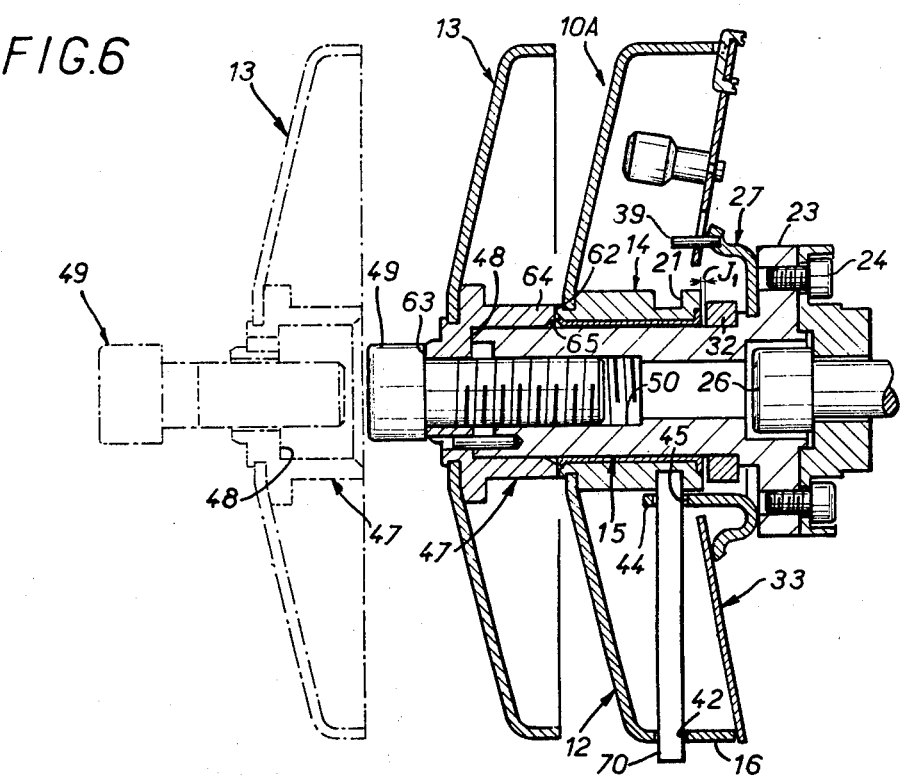
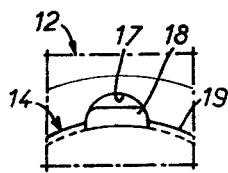
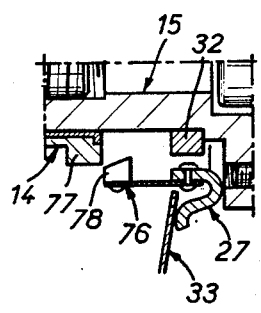
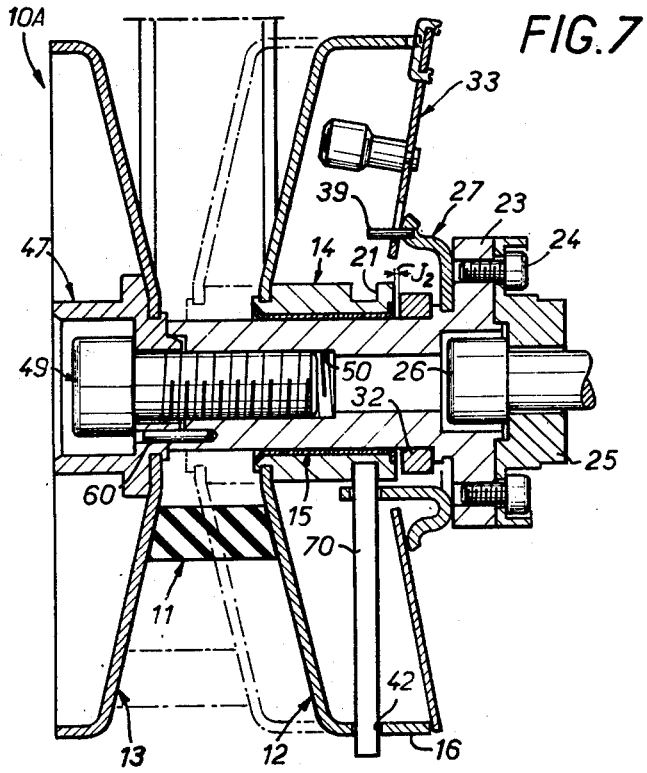

SHEAVE FOR A SPEED VARIATOR AND A METHOD OF REPLACING A BELT THEREON

FIELD OF THE INVENTION

The present invention relates generally to belt driven speed variators or positive infinitely variable (or PIV) drives of the type adapted to be used to transmit driving torque from a motor to some device and more particularly to such speed variators used on a motor vehicles for transmitting driving torque to some auxiliary device, such as an alternator, a water pump or a fan, fitted on the vehicle.

The sheaves or frustoconical pulleys of such speed variators comprise, in a manner known per se, two coaxial sheave sides facing each other, one of which referred to as the movable or shiftable sheave side is urged by resilient biasing means axially towards the other, fixed sheave side.

BACKGROUND OF THE INVENTION

One of the problems to be overcome with such speed variators relates to the changing of the belt between the driving and driven sheaves in order to make the operation as easy as possible as well as to facilitate the changing of auxiliary transmission belts connected between the driven sheave and auxiliary devices driven thereby.

Keeping in mind the lack of space usually available around the speed variator sheaves, the changing of the V-belt normally requires the dismounting of the fixed side of at least one of the sheaves, with respect to both the movable side of the sheave and their common shaft.

The remounting of the fixed side may prove difficult because it requires overcoming the biasing force exerted by the resilient biasing means associated with the movable side, and because, where the sheave is the driving sheave, the spring force is relatively high and may be of the order of 150 to 200 kg.

SUMMARY OF THE INVENTION

An object of the present invention is to provide a speed variator sheave which is itself provided, at least in part, with means facilitating the remounting of the fixed side in operative position after it has been removed and a belt has been put back into place.

Another object of the present invention is a novel method of dismounting the fixed sheave side and remounting it once the belt has been put back into place.

A still further object of the present invention provides means for retaining the resilient biasing means in their retracted position while the belt and the fixed sheave side are put back into their operative position.

According to one aspect of the invention there is provided a sheave for a speed variator of the kind comprising a shaft, two coaxial sheave sides facing each other including a movable side mounted for sliding movement on said shaft and rotation with said shaft, and a fixed side also fixed for rotation with said shaft, joined in operation to said shaft against axial movement and adapted to be dismounted with respect to both said shaft and said movable side, said fixed side having an axially extending hub and a retaining shoulder, a screw fastener normally effectively bearing axially against the retaining shoulder for securing said hub at an end of said shaft, and resilient biasing means normally urging said movable side towards said fixed side, wherein the improvement comprises: a thrust shoulder on said hub adapted to effectively bear against said movable side once the fixed side has been dismounted and turned around, and a bearing shoulder also on said hub against which said screw fastener is adapted to bear once said fixed side has been turned around, releasable retaining means coacting with means fixed axially with respect to said shaft so as to axially retain the movable side temporarily against biasing force exerted thereon by said resilient biasing means.

According to another aspect of the present invention there is provided a method for replacing a V-belt on a sheave of a belt transmission in which said sheave comprises a fixed and a movable side normally facing each other, each of the sheave sides effectively mounted for rotation with a common shaft, resilient biasing means normally urging said movable side towards said fixed side, said movable side having a hub slidably mounted on said shaft, and a threaded member for fixing said fixed side on one end of said shaft, said method comprising the steps of:

(a) unscrewing said threaded member, removing said fixed side, turning it around and bringing it into position at said one end of said shaft;

(b) tightening said threaded member on said shaft thereby forcing both said fixed and movable sides against the biasing force of said biasing means to a retracted position;

(c) temporarily retaining said movable side in its retracted position;

(d) removing said fixed side, turning it back around and fixing it again in its operative position at said one end of said shaft;

(e) introducing a V-belt in said sheave thus temporarily held open against biasing force; and (f) releasing said movable side so that said resilient biasing means urges said V-belt snugly between said fixed and movable sides for operation.

In order to put the fixed side back into position after it has been dismounted and the belt removed, where necessary, it is sufficient to turn the fixed side around and use the threaded fastener as a power screw to force the movable side by means of the hub of the fixed side against the biasing force of the resilient biasing means to a retracted position in which the movable side may be held in place temporarily by releasable retaining means.

Since the movable side is thus axially retained in its retracted position it is possible, owing to the invention, in a second step to remove the fixed side which was temporarily mounted backwards on the shaft and put it back into its operative position after a belt, e.g. a new belt, has been put back into position.

In a third step, the movable side is freed by releasing the retaining means, which may in certain circumstances be effected automatically, e.g. by centrifugal force, once the sheave has been set into rotation.

These and other features and advantages of the present invention will become more apparent from the description which follows, given by way of example, with reference to the accompanying diagrammatic drawings.

BRIEF DESCRIPTION OF THE DRAWINGS

FIG. 2 is a detail taken along the line II—II in FIG. 1;

FIG. 3 is an enlarged view of an inset III in FIG. 1;

FIG. 4 is a partial side view of the sheave, taken along the arrow IV in FIG. 1;

FIGS. 5, 6 and 7 are axial sectional views of the sheave and illustrate the various steps in reassembling of the fixed side thereof;

FIG. 8 is a partial elevational view of the fixed side only, taken along the direction of the arrow VIII in FIG. 1; and FIG. 9 is a detail of a modified embodiment similar to the view in FIG. 1.

In FIG. 1 will be recognized a speed variator or positive infinitely variable drive comprising, as is conventional, a driving sheave 10A, a driven sheave 10B, and a trapezoidal or V-belt 11 forming an endless loop over the sheaves.

Figure 1:
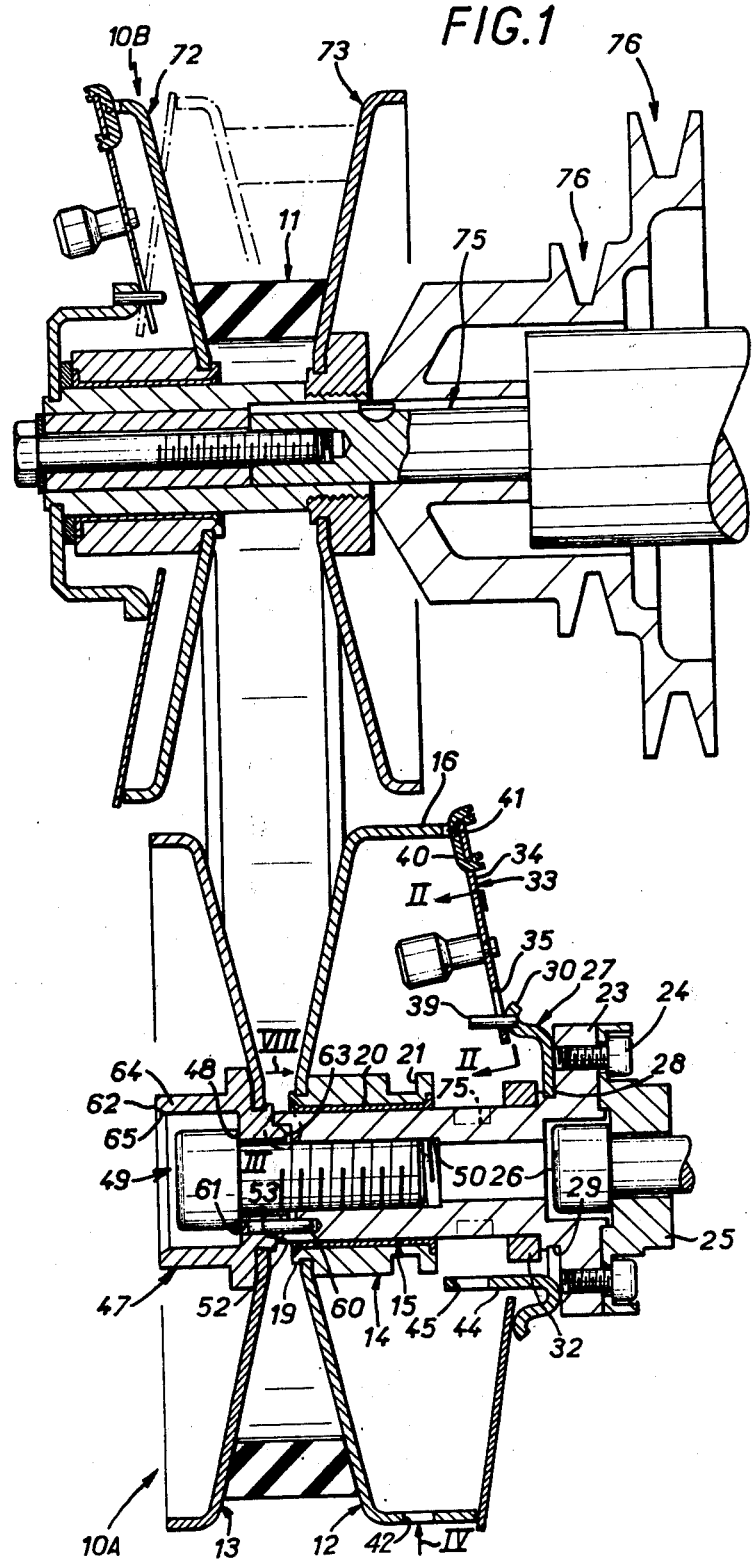
FIG. 1 is an axial cross-section of a speed variator having a sheave embodying the present invention.

In the illustrated embodiment the movable or shiftable sheave side 12 of the driving sheave is secured on a tubular hub 14 which projects axially, opposite the fixed sheave side 13 of the driven sheave and by which the driving sheave is slidably mounted on the drive shaft 15; a generally axially extending cylindrical rim 16 is formed integrally with the web of the movable side.

In the illustrated embodiment, and as shown in FIG. 8, the hub 14 is fixed to the movable side 12 by grooves in the internal periphery of the movable side and radial lugs 18 formed on the hub 14 right during the axial crimping which secures the hub to the movable side 12 and forms a retaining collar 19 at the end of the hub, beyond the sheave side 12.

The assembly operation just alluded to is known per se and therefore need not be described in greater detail herein. It will simply be noted that the notches 17 which may be variable in number are preferably rounded, as shown in FIG. 8.

Along the internal periphery of the hub 14 there is provided for facilitating its sliding movement on the shaft 5, an antifriction lining 20 crimped to the ends of the hub 14.

Hub 14 has in its outer periphery at its end remote from the movable side 12 an annular groove 21, for reasons which will be apparent hereinafter.

In the illustrated embodiment the shaft 15 is equipped with a radial flange 23 at its end remote from the movable side 12 which flange is held in contact against an intermediary member 25 by screws 24, the intermediary member is in turn fixed for rotation with a drive shaft, not shown.

The radial flange 23 on the shaft 15 backs an annular member 27 which is adapted to form an annular support member for the resilient biasing means associated with the movable side 12.

In the illustrated embodiment the annular support member 27 is cup-shaped, formed of sheet metal and has a central aperture to permit its mounting on a neck 29 on the shaft 15; the sidewall of the cup-shaped annular member terminates in a rim 30, curved in section.

The annular support member 27 is force-fitted on the neck on shaft 15, in a manner known per se, so that the annular support member is keyed for rotation with the shaft 15, and after being force-fitted on the shaft the annular support member is crimped on the bottom end 28 thereof so that it is axially fixed with respect to the shaft 15; it is therefore fixed in all respects relative to the movable side of the sheave.

In the preferred embodiment an annular abutment 32 is disposed between the hub 14 of the movable sheave side 12 and the neck 29 on the shaft 15.

In the illustrated embodiment the resilient biasing means for the movable side 12 of the sheave comprises an annular or diaphragm spring 33 having an outer peripheral Belleville washer portion 34 which bears against the edge of the sheave rim 16 and a central portion 35 which is divided into radial fingers 36 by alternating radial slots 37, FIG. 2, and bears against the curved rim 30 of the annular support member 27 described above, FIG. 1.

According to a feature of the invention, the radial fingers 36 of the diaphragm spring 33, or at least one thereof, comprise elongate radial passageway 38 engageable respectively with locating and driving pins 39 projecting axially from the curved rim 30 of the annular support member 27.

The pins 39 are snugly received in their corresponding passageways so that, on the one hand, the diaphragm spring is keyed for rotation with the annular support member 27, and on the other hand, its centering is ensured jointly by lateral contact with the locating and driving pins 39 against the corresponding edges of the passageways 38.

At its outer periphery, the diaphragm spring 33 carries axially protruding pads 40 which are set in notches 41 provided for this purpose in the rim 16 of the movable sheave side 12, FIGS. 1 and 4, so that the movable sheave side 12 is thus fixed for rotation on the diaphragm spring 33 thereby to the annular support member 27 which is fixed for rotation with the shaft 15.

Besides the notches 41 the rim of the movable sheave side 12 also comprises, for reasons which will be apparent hereinafter, at least one hole 42, FIGS. 1 and 4.

Likewise for reasons which will be apparent hereinafter, the annular support member 27 carries, axially protruding towards the movable sheave side 27, at least one tab 44 having a hole 45, and according to a preferred illustrated embodiment, the tab 44 is cut out of the bottom wall 28 of the annular support member and therefore integrally formed therewith.

The fixed sheave side 13 of the drive sheave 10A is also fixed to a hub 47, by radial lugs and notches as described above. This hub 46 extends axially, at least in part away from the fixed sheave side 12 and has a retaining shoulder 48 against which a threaded fastener 49 bears directly, in the illustrated embodiment. The threaded fastener axially secures the fixed sheave side 13 against the end of the shaft 15 which is provided with an axially tapped bore 50 for this purpose.

In practice, as seen in the illustrated embodiment, the hub 47 of the fixed sheave side 13 has, facing the movable sheave side 12, an engagement shoulder 52 by which it abuts a shoulder 53 provided for this purpose on the shaft 15, and disconnectable drive means are provided between the shoulders, FIGS. 1 and 3.

In the illustrated embodiment the disconnectable drive means comprises at least one axially drive pin 60, protruding from the shaft 15, adapted to be received in a complementary bore 61 in the hub 47 of the fixed sheave side, FIG. 1.

According to a feature of the invention, the hub 47 has, in addition, axially and in combination, (1) facing away from the movable sheave side 12 a thrust shoulder 62 by which, after dismounting and turning the fixed sheave side 13 around, as described below, is adapted to abut against the movable sheave side 12 and (2) adjoining the movable sheave side a bearing shoulder 63, FIGS. 1 and 3, against which the head of the threaded fastener abuts after the fixed sheave side has been turned around.

In the present embodiment, the retaining shoulder 48 on the hub 47 is axially offset relative to the thrust shoulder 62 thereon, the thrust shoulder being formed at the end of a tubular section 64 on the hub, which has an internal bore of diameter greater than the outer diameter of the shaft 15, and therefore may be received on the shaft 15.

In the illustrated embodiment, the tubular section 64 in question has, at the inner periphery of its free end, a chamfer 65. Further, the bearing shoulder 63 on the hub 47 is itself formed at the end of a tubular section 67 of smaller dimension, FIGS. 1 and 3, and the shaft 15 is provided axially and around the tapped bore 50, a counter bore 68 adapted to be received in the tubular section 67 of the hub 47.

Preferably, the tubular section 67 is provided with a chamfer 69 at the outer periphery of its free end.

Lastly, with the movable sheave side 12 are associated releasable retaining means, in cooperation with the axially fixed member, to temporarily retain the fixed sheave side against the bias of the diaphragm spring 33. In the embodiment illustrated in FIGS. 1-7, the removable retaining means comprises a retaining rod 70, FIGS. 6 and 7, which constitutes an independent and distinct part or member; it may, for instance, be a shank of a screwdriver or another tool of this kind, but it may also be a special member associated with the variator.

The driven sheave 10B of the variator is, overall, of the same construction as that of the driving sheave 10B described above and therefore comprises a sheave side 72 movable axially relative to the fixed sheave side 73, but contrary to the above described arrangement, no releasable retaining means are associated with this movable sheave side 72 and the fixed sheave side 73 is not provided with the various annular shoulders described above. The driven sheave accordingly need not be described in detail here.

It will only be pointed out that on the shaft 75 are keyed various sheaves 76 adapted to run belts for different rotatably driven devices, such as a fan, or a water pump on an automobile.

The biasing force of the diaphragm spring associated with the movable side 12 of the drive sheave 10A is usually greater than that of the diaphragm spring of the movable side 72 of the driven sheave 10B so that, in its rest position of the variator or PIV drive, as illustrated, the V-belt 11 is closer to the outer periphery of the sheave 10A while it is closer to the inner periphery of the driven sheave 10B.

The V-belt 11 may be removed, e.g., to change it or to gain access to the sheaves 76 in order to change one of their belts by dismounting the fixed side 13 of the drive sheave 10A by unscrewing the threaded fastener 49. FIG. 5.

In order to replace the V-belt 11 and remount the fixed side of the driving sheave 10A, one must be able to overcome the axial biasing force of the diaphragm spring 33 to retract the movable side 12 of the driving sheave.

The above-described arrangements facilitate this operation.

In a first step, FIG. 6, the fixed side 13 is turned completely around, as shown in phantom lines; the tubular section 64 of the hub 47 is then received backwards on the shaft 15 as shown in solid lines in the same figure.

The fixed side 13 then comes into contact through the thrust shoulder 62 on its hub 47 with the hub 14 of the movable sheave side 12, the threaded fastener 49 coming into abutment with the abutment shoulder 63 and serving as a power screw: by tightening the threaded fastener the fixed side 13 is forced to move the movable side 12 gradually to the right, as shown.

It will be understood that the chamfer 65 on the tubular section 64 on the hub 47 of the fixed sheave side 13 facilitates the receiving of the hub 47 onto the shaft 15.

When the movable sheave side 12 has been sufficiently retracted for the peripheral groove 21 in the hub 14, which is in axial alignment with the hole 42 in its rim 16, to be directly opposite the hole 45 in the axial tab 44 in the annular support member, FIG. 6, the retaining rod 70 may be introduced into the hole 42 in the rim 16 and into the hole 45 in the axial tab 44 until the retaining rod protrudes into the peripheral groove 21 on the hub 14, FIG. 6; at this point there still remains clearance J1 between the free end of the hub 14 and the annular abutment 32.

The retaining rod 70 cooperates thereafter to retain the movable sheave side 12, by the hole 45 in the axial tab 44 of the annular support member 27, which constitutes an axially fixed member, and with the transverse retaining shoulders formed jointly by the edge of the hole 42 and the sides or flanks of the groove 21 in the hub 14, closest to the diaphragm spring 33.

The movable sheave side 12 is thus temporarily retained and it is then possible to remove the fixed side 13 from the shaft 15 and put the V-belt back into place or put a new V-belt into place and then remount the fixed flange 13 in its operative position, FIG. 7.

It will be understood that the chamfer 69 on the hub 47 of the fixed side 13 facilitates the positioning of the hub which is carried out blindly, as it is hidden from view by the V-belt.

In its operative position once again, the fixed flange urges the movable flange 12 through the V-belt 11 which reduces the clearance J1 to J2 between the hub 14 and the annular abutment 32 whereby the retaining rod 70 is thus unwedged and may be easily removed. The movable side 12 is then freed and returns to its operative position closer to the fixed sheave side 12, as schematically illustrated in phantom lines in FIG. 7.

In the foregoing description the fixed member with which the retaining rod 70 cooperates was an axial tab on the annular support member. It may, however, be some other fixed member, for example, the shaft 15 itself, which may accordingly be with an annular groove into which the retaining rod 70 may penetrate, as illustrated in phantom lines 75 in FIG. 1.

According to a non-illustrated modified embodiment, the fixed member necessary for axially retaining the movable sheave side 12 is outside the variator concerned; for example, it may be a lug disposed for this purpose on the engine block with which the variator is associated.

Moreover, and irrespective of the nature of the fixed member, the hole 42 in the rim 16 and/or the groove 21 in the hub 14 alone may be provided in the movable sheave side 12 for cooperation with the retaining rod 70.

According to a modified embodiment illustrated in FIG. 9, the releasable retaining means associated with the movable sheave side 12 of the drive sheave 10A comprises at least one latching arm with a dog 76 which projects generally axially from the annular support member 27 and is resiliently radially deformable for effective disconnectable engagement with the movable sheave side 12, that is, with a part fixed or integral therewith.

For example, the hub 14 for the movable sheave side 12 may comprise a radial collar 77 which, when the movable side 12 is in its retracted position and the variator is stopped, snaps into engagement with the latching arm.

When the drive sheave 10A is subsequently set into rotation, the latching arm releases itself owing to the centrifugal force exerted thereon, the hub 14 of the movable sheave side 12, the latching arm being made more sensitive to centrifugal force, if necessary, by providing the latching dog with a small flyweight which, as shown, may be formed as the latching dog therefor.

As above, the latching arm is released when the fixed sheave side 13 is put back into position, the sheave side thrusts the movable sheave side 12 through the V-belt 11.

In practice, there is no chance that during operation the hub 14 of the movable sheave side 12 will accidentally hook onto the latching arm, because in the corresponding axial position of the movable sheave side, the rotational speed of the driving sheave is such that the latching arm is sufficiently deflected outwardly to obviate its coming into contact with the hub on the movable sheave side.

The present invention is, of course, not limited to the embodiments described and illustrated herein but encompasses all modifications, variants and expedients and/or combinations thereof within the scope of the appended claims.

Accordingly, as it was noted above the passageways 38 in which the locating and driving pins 39 are received are formed in the radial fingers 36 on the diaphragm spring 33.

Thanks to this arrangement there is ensured a precise adjustment of the mounting of the locating and driving pins carried by the abutment 27 and the radial passageways 38 in the fingers 36 of the diaphragm spring 33 in which the locating and driving pins are received since, by construction, these passageways have a uniform width which is unaffected by the flattening of the frustoconical configuration of the diaphragm spring in the course of rotation of the corresponding sheave.

The advantages of this arrangement will be better understood if it is recalled that in prior art constructions the corresponding locating pins are usually received in the slots between the radial fingers with which they alternate around the periphery of the diaphragm spring.

But the width of those slots, in practice, vary according to the angular velocity of the associated sheave, owing to the gradual flattening of the frustoconical configuration as a function of increasing rotational speed.

Consequently a precision adjustment of the locating pins in question in their slots was not previously possible and in operation noise and wear generating play between the parts occurred. Moreover, in accordance with the invention, and by reasons of their adjustment that may be with precision, the locating pins 39 on the annular support 27 may, advantageously, themselves ensure the centering of the diaphragm spring 33 by lateral contact with the edges of the passageways in the radial fingers with which they are in engagement.

Therefore, for this centering, it is not necessary to provide any special means whatsoever, this arrangement has proven to be particularly economical since the required passageways in the radial fingers in the diaphragm spring may be formed therein at no additional cost when the diaphragm spring is blanked.

What is claimed is:

1. A sheave for a speed variator of the kind comprising a shaft, two coaxial sheave sides facing each other including a movable side mounted for sliding movement on said shaft and rotation with said shaft, and a fixed side also fixed for rotation with said shaft, joined in operation to said shaft against axial movement and adapted to be dismounted with respect to both said shaft and said movable side, said fixed side having an axially extending hub and a retaining shoulder, a screw fastener normally effectively bearing axially against the retaining shoulder for securing said hub at an end of said shaft, and resilient biasing means normally urging said movable side towards said fixed side, wherein the improvement comprises: a thrust shoulder on said hub adapted to effectively bear against said movable side once the fixed side has been dismounted and, turned around, and a bearing shoulder also on said hub against which said screw fastener is adapted to bear once said fixed side has been turned around, releasable retaining means coacting with means fixed axially with respect to said shaft so as to axially retain the movable side temporarily against biasing force exerted thereon by said resilient biasing means.

2. A sheave according to claim 1, wherein said retaining shoulder on said hub is axially set back relative to said thrust shoulder thereon, said thrust shoulder being formed at the end of a tubular section normally extending away from said shaft and adapted to be received thereon once said fixed side is turned around.

3. A sheave according to claim 2, comprising a chamfer adjoining said thrust shoulder and at the inner periphery of said tubular section for facilitating sliding of said hub onto said shaft.

4. A sheave according to claim 2, wherein said bearing shoulder on said hub is formed at an end of another tubular section of smaller transverse dimension, and said shaft comprises a counterbore adapted to receive said tubular section on said hub.

5. A sheave according to claim 4, wherein said other tubular section of smaller transverse dimension is provided with a chamfer at its outer periphery, adjoining said bearing shoulder.

6. A sheave according to claim 1, wherein said fixed side further comprises an engagement shoulder adapted to abut a complementary shoulder on said shaft, disconnectable drive means being provided between said bearing shoulder and said complementary shoulder for fixing said hub for rotation with said shaft.

7. A sheave according to claim 1, wherein said hub is crimped on said fixed side, lugs being formed around the periphery of said hub in engagement with notches in the inner periphery of the web of said fixed side for fixing said web for rotation with said hub.

8. A sheave according to claim 1, wherein said releasable retaining means comprises a distinct and independent retaining rod adapted to be inserted in a hole in said axially fixed means to cooperate with at least one retaining shoulder effectively disposed on said movable side.

9. A sheave according to claim 8, wherein said movable side comprises a web and a peripheral rim, said last-mentioned retaining shoulder comprises an edge of a hole in said rim, which hole is adapted to receive said retaining rod.

10. A sheave according to claim 8, comprising a slidable hub for said movable side, and wherein said retaining shoulder is defined on said slidable hub.

11. A sheave according to claim 10, wherein said retaining shoulder comprises a wall of an annular groove in said slidable hub.

12. A sheave according to claim 8, wherein said axially fixed means comprises a portion of said shaft.

13. A sheave according to claim 8, said resilient biasing means associated with said movable side comprising a diaphragm spring disposed between said movable side and an axially fixed annular support member, and wherein said retractable retaining means comprises at least one latching arm projecting generally axially from said annular support member and being resiliently radially deformable for releasable engagement effectively with said movable side.

14. A sheave according to claim 8, wherein said resilient biasing means comprises a diaphragm spring interposed between said movable side and an axially fixed annular support member, said releasable retaining means comprising at least one radially resiliently deformable latching arm projecting generally axially for releasable engagement effectively with said slidable hub.

15. A sheave according to claim 14, wherein said annular support member is of cup-shaped sheet metal construction having a central cutout in a bottom wall.

16. A sheave according to claim 10, wherein said slidable hub of the movable sheave side is fixed to the same by cooperable lugs and notches formed respectively thereon.

17. A sheave according to claim 1, wherein said resilient biasing means comprises a diaphragm spring having a Belleville washer peripheral portion bearing against said movable sheave side and a central portion divided into a plurality of radial fingers alternating with slots, said central portion bearing against an annular support member fixed against axial movement and for rotational movement with said shaft, said annular support member having protruding locating and driving pins cooperable with said radial fingers for coupling said diaphragm spring for rotation therewith and thereby with said movable side; wherein at least said fingers have elongate passageways in which said locating and driving pins are received.

18. A sheave for a speed variator of the kind comprising a shaft, two coaxial sheave sides facing each other including a movable side mounted for sliding movement on said shaft and rotation therewith, and a fixed side also mounted for rotation with said shaft and secured in operation to said shaft against axial movement; resilient biasing means urging said movable side towards said fixed side, said biasing means urging a diaphragm spring having a peripheral Belleville washer portion for bearing against said movable side and a central portion divided into radial fingers alternating with slots for bearing against an annular support member fixed for rotation and axial movement with said shaft, said annular support member having protruding locating and driving pins; wherein the improvement comprise a radially elongated passageway defined in each of said radial fingers, said locating and driving pins being received for relative displacement in said radial passageways coupling said diaphragm spring for rotation with said locating and driving pins and thereby with said movable sheave side.

19. A sheave for a speed variator of the kind comprising a shaft, two coaxial sheave sides facing each other and mounted for rotation with said shaft, including a movable sheave side mounted for sliding movement on said shaft and a fixed side having a hub normally fixed in abutment at one end of said shaft by a threaded member, resilient biasing means for urging said movable side towards said fixed side, wherein upon removal of said threaded member said fixed side being adapted to be dismounted from said shaft, turned around and received in reversed position on said shaft, said hub in said reversed position being adapted to urge the movable side against said resilient biasing means to a retracted position in response to tightening of said threaded member, and releasable retaining means adapted to coact with axially fixed means to temporarily retain said movable side in its retracted position while said fixed side is remounted and fixed back into its operating position by said threaded member.

20. A sheave for a speed variator of the kind comprising a shaft, a normally fixed side and a movable side arranged in coaxial, facing relation and mounted for rotation with said shaft, said fixed side having a hub, a threaded fastener cooperable with said shaft for fixing in abutment at one end thereof said hub and therefore said fixed side in its operative position, resilient biasing means for urging said movable side towards said fixed side along said shaft, said fixed side also having a reversed position in which said hub is in thrusting contact with said movable side so that in response to tightening of said threaded fastener said fixed side hub urges said movable side against the biasing force exerted by said resilient biasing means to a retracted position, and means for temporarily retaining said movable side in its retracted position while said fixed side is removed, turned around and fixed again in its operative position by said threaded fastener.

21. A method of replacing a V-belt on a sheave of a belt transmission in which said sheave comprises a fixed and a movable side normally facing each other, each of the sheave sides effectively mounted for rotation with a common shaft, resilient biasing means normally urging said movable side towards said fixed side, said movable side having a hub slidably mounted on said shaft, and a threaded member for fixing said fixed side on one end of said shaft, said method comprising the steps of:
(a) unscrewing said threaded member, removing said fixed side, turning it around and bringing it into position at said one end of said shaft;
(b) tightening said threaded member on said shaft thereby forcing both said fixed and movable sides against the biasing force of said biasing means to a retracted position;
(c) temporarily retaining said movable side in its retracted position;
(d) removing said fixed side, turning it back around and fixing it again in its operative position at said one end of said shaft;
(e) introducing a V-belt in said sheave thus temporarily held open against biasing force; and
(f) releasing said movable side so that said resilient biasing means urges said V-belt snugly between said fixed and movable sides for operation.

* * * * *